(12) United States Patent
Chiang

(10) Patent No.: US 10,222,821 B1
(45) Date of Patent: Mar. 5, 2019

(54) TORSION DEVICE AND TORSION WASHER

(71) Applicant: FOSITEK CORPORATION, New Taipei (TW)

(72) Inventor: I-Hung Chiang, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 15/926,463

(22) Filed: Mar. 20, 2018

(51) Int. Cl.
| | |
|---|---|
| *E05D 5/10* | (2006.01) |
| *G05G 15/08* | (2006.01) |
| *B23Q 11/04* | (2006.01) |
| *E05D 11/08* | (2006.01) |

(52) U.S. Cl.
CPC ............ *G05G 15/08* (2013.01); *B23Q 11/04* (2013.01); *E05D 11/084* (2013.01)

(58) Field of Classification Search
CPC .............. E05D 11/082; E05D 11/084; E05D 2011/085; G05G 15/08; Y10T 16/54038; Y10T 16/547

See application file for complete search history.

(56) References Cited

U.S. PATENT DOCUMENTS

| | | | | |
|---|---|---|---|---|
| 9,057,215 | B1* | 6/2015 | Horng | ................. E05D 3/12 |
| 2007/0094845 | A1* | 5/2007 | Chang | ............... G06F 1/1616 |
| | | | | 16/342 |
| 2011/0314636 | A1* | 12/2011 | Chen | ................... E05D 5/14 |
| | | | | 16/319 |
| 2014/0290008 | A1* | 10/2014 | Hsu | ....................... E05D 3/06 |
| | | | | 16/386 |
| 2014/0338483 | A1* | 11/2014 | Hsu | ..................... F16H 21/44 |
| | | | | 74/96 |
| 2017/0138102 | A1* | 5/2017 | Chuang | ................. E05D 3/06 |
| 2018/0112447 | A1* | 4/2018 | Hatano | ............... G06F 1/1681 |
| 2018/0239402 | A1* | 8/2018 | Wang | ................. G06F 1/1681 |

* cited by examiner

*Primary Examiner* — Bradley T King
(74) *Attorney, Agent, or Firm* — Li & Cai Intellectual Property (USA) Office

(57) ABSTRACT

A torsion washer integrally formed as a one-piece structure includes an external ring-shaped portion, a first abutting arm and a second abutting arm both separately extending from an inner edge of the external ring-shaped portion, and a connecting lever connecting the first and second abutting arms. The inner edge includes a first arc segment and an opposite second arc segment, and centers of circle of the first and second arc segments are located in a space surrounded by the inner edge. Free ends of the first and second abutting arms do not contact the inner edge. A distance between a first abutting portion of the first abutting arm and the first center of circle is less than a radius of the first arc segment. The connecting lever is spaced apart from the inner edge, allowing the first and second abutting arms to be interlinked with each other.

17 Claims, 10 Drawing Sheets

TORSION DEVICE AND TORSION WASHER

BACKGROUND OF THE INVENTION

1. Field of the Invention

The present disclosure relates to a torsion structure; in particular, to a torsion device and a torsion washer each provided for being co-operable with dual shafts.

2. Description of Related Art

A conventional torsion device includes a plurality of torsion washers and at least one shaft inserted into the torsion washers, and provides a torsion by the cooperation between the shaft and each of the torsion washers. However, the torsion of the conventional torsion washer is a fixed value, so that the conventional torsion device cannot be applied to electronic devices demanding different torsions.

SUMMARY OF THE INVENTION

The present disclosure provides a torsion device and a torsion washer to solve the problem associated with conventional torsion washers.

The present disclosure provides a torsion device, which includes a plurality of torsion washers, a first shaft, and a second shaft. The torsion washers are stacked in a row, and each of the torsion washers is integrally formed as a one-piece structure. Side edges of the torsion washers are flush with each other, and each of the torsion washers includes an external ring-shaped portion, a first abutting arm, a second abutting arm, and a connecting lever. Specifically, the external ring-shaped portion is completely enclosed and has an inner edge. The inner edge includes a first arc segment and a second arc segment opposite to the first arc segment. A first center of circle of the first arc segment and a second center of circle of the second arc segment are located in a space surrounded by the inner edge. The first abutting arm and the second abutting arm both extend from the inner edge and are arranged separate from each other. A first free end of the first abutting arm and a second free end of the second abutting arm do not contact the inner edge. The first abutting arm and the first arc segment co-define a first thru-hole, and the second abutting arm and the second arc segment co-define a second thru-hole. A distance between a first abutting portion of the first abutting arm and the first center of circle is defined as an interference distance that is less than a first radius of the first arc segment. The connecting lever has a first end and a second end opposite to the first end. The first end and the second end are respectively connected to the first abutting arm and the second abutting arm, the connecting lever is spaced apart from the inner edge, and the first abutting arm and the second abutting arm are interlinked with each other through the connecting lever. The first shaft passes through the first thru-hole of each of the torsion washers. The first shaft is positioned between the first arc segment and the first abutting portion of each of the torsion washers. The second shaft passes through the second thru-hole of each of the torsion washers. For each of the torsion washers, when the first shaft is spun around a central axis thereof in a predetermined angle range, the first shaft pushes the first abutting portion apart so as to drive the second abutting arm through the connecting lever to abut against the second shaft.

The present disclosure also provides a torsion washer integrally formed as a one-piece structure. The torsion washer includes an external ring-shaped portion, a first abutting arm, a second abutting arm, and a connecting lever. The external ring-shaped portion is in an enclosed shape and has an inner edge. The inner edge includes a first arc segment and a second arc segment opposite to the first arc segment. A first center of circle of the first arc segment and a second center of circle of the second arc segment are located in a space surrounded by the inner edge. The first abutting arm and the second abutting arm both extend from the inner edge and are arranged separate from each other. A first free end of the first abutting arm and a second free end of the second abutting arm do not contact the inner edge. The first abutting arm and the first arc segment co-define a first thru-hole, and the second abutting arm and the second arc segment co-define a second thru-hole. A distance between a first abutting portion of the first abutting arm and the first center of circle is defined as an interference distance that is less than a first radius of the first arc segment. The connecting lever has a first end and a second end opposite to the first end. The first end and the second end are respectively connected to the first abutting arm and the second abutting arm, the connecting lever is spaced apart from the inner edge, and the first abutting arm and the second abutting arm are interlinked with each other through the connecting lever.

In summary, the torsion device of the present disclosure adopts a specific structure of the torsion washer (e.g., the connecting lever connects the first abutting arm to the second abutting arm) to cooperate with the first shaft and the second shaft, so that the torsion device can provide torsions of different values as the first shaft is spun to different positions relative to the torsion washers. Thus, the torsion device of the present disclosure can be applied to an electronic device demanding different torsions.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

References are hereunder made to the detailed descriptions and appended drawings in connection with the present disclosure. However, the appended drawings are merely provided for exemplary purposes, and should not be construed as restricting the scope of the present disclosure.

First Embodiment

Figure 1:
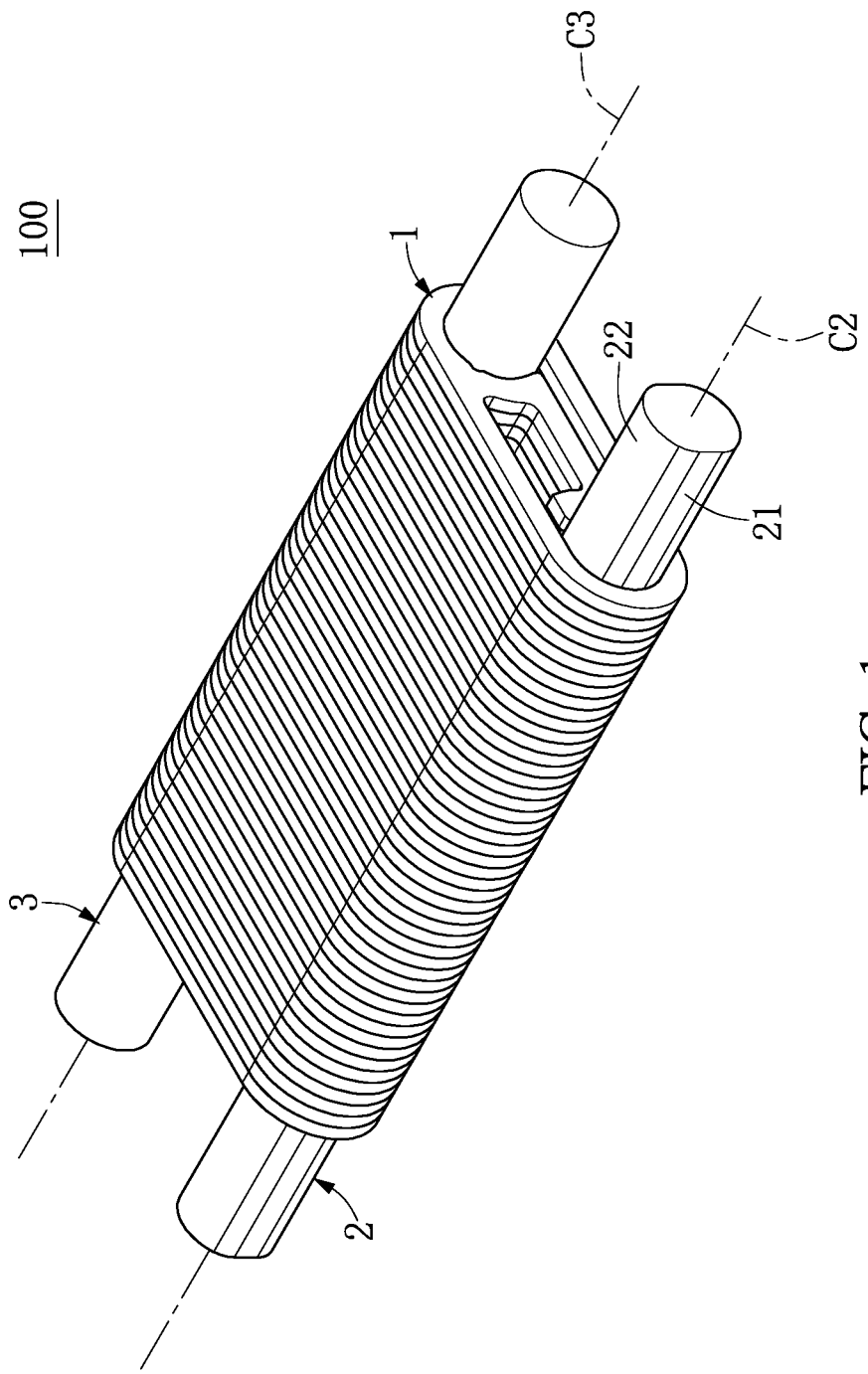
FIG. 1 is a perspective view showing a torsion device according to a first embodiment of the present disclosure.
Figure 2:
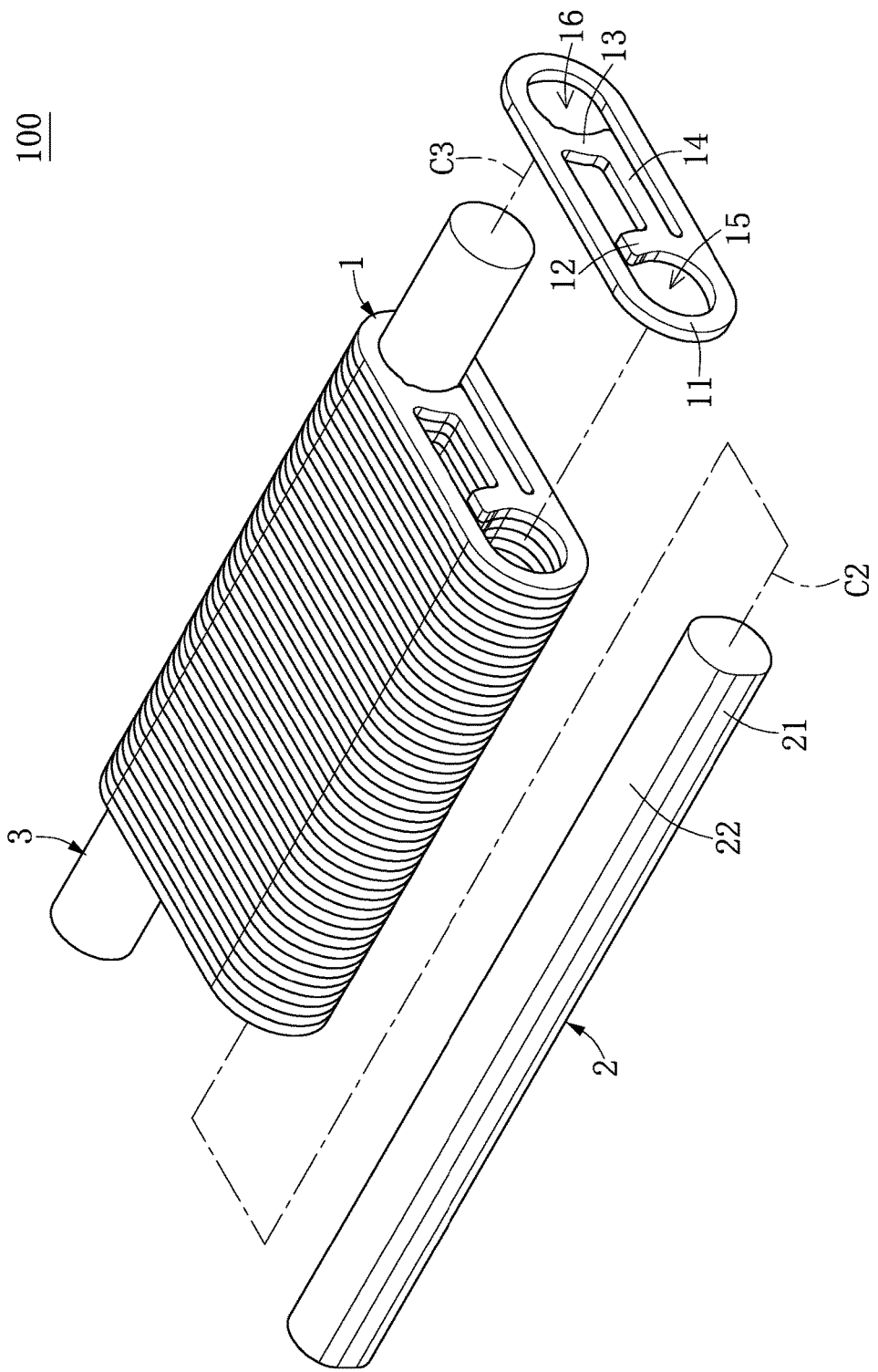
FIG. 2 is an exploded view of FIG. 1.

Reference is made to FIGS. 1 to 5, which illustrate a first embodiment of the present disclosure. The present embodiment discloses a torsion device 100 for being applied to meet different torsion demands. For example, a touch-control screen of a laptop computer can be raised from a closed position by using a lower torsion, but when the touch-control screen and the keyboard of the laptop computer have an angle within a range of 85~100 degrees, the touch-control screen would need to receive a higher torsion for supporting touch control. As shown in FIGS. 1 and 2, the torsion device 100 includes a plurality of torsion washers 1 stacked in a row, a first shaft 2, and a second shaft 3, the latter two of which pass through the torsion washers 1. The side edges of the torsion washers 1 in the present embodiment are preferably flush with each other, but the present disclosure is not limited thereto.

It should be noted that as the torsion washers 1 in the present embodiment are of the same structure, the following description discloses only the structure of one of the torsion washers 1 for the sake of brevity, but the present disclosure is not limited thereto. For example, in other embodiments of the present disclosure, the torsion washers 1 can be provided with different structures.

As shown in FIGS. 2 to 5, the torsion washer 1 in the present embodiment is integrally formed as a one-piece structure, and includes an external ring-shaped portion 11, a first abutting arm 12 and a second abutting arm 13 both extending from the external ring-shaped portion 11 and arranged separate from each other, and a connecting lever 14 connecting the first abutting arm 12 and the second abutting arm 13.

The external ring-shaped portion 11 is completely enclosed and has an inner edge 111. The inner edge 111 includes a first arc segment 112, a second arc segment 113 opposite to the first arc segment 112, and two connecting segments 114 arranged between the first arc segment 112 and the second arc segment 113. The two connecting segments 114 in the present embodiment are straight in shape and are preferably parallel to each other, but the present disclosure is not limited thereto.

Specifically, a first center of circle O1 of the first arc segment 112 and a second center of circle O2 of the second arc segment 113 are located in a space surrounded by the inner edge 111. A radius of the first arc segment 112 (hereafter referred to as a first radius R1) in the present embodiment is substantially equal to a radius of the second arc segment 113 (hereafter referred to as a second radius R2), but the present disclosure is not limited thereto. Moreover, in the present embodiment, the external ring-shaped portion 11 defines a central line L passing through the first center of circle O1 and the second center of circle O2, the two connecting segments 114 are parallel to the central line L, and the external ring-shaped portion 11 is substantially mirror symmetrical to the central line L.

Figure 3:
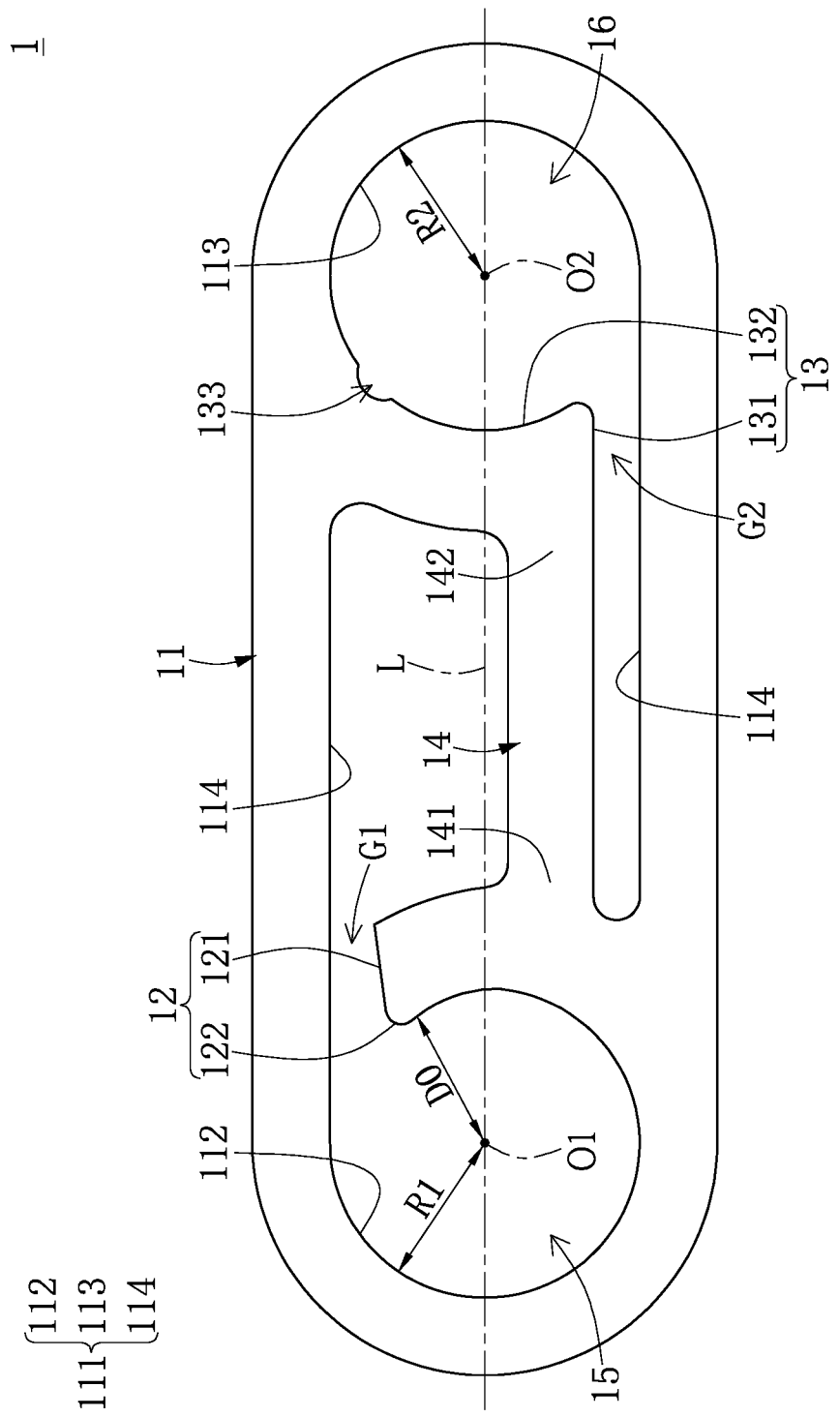
FIG. 3 is a planar view showing a torsion washer according to the first embodiment of the present disclosure.
Figure 4:
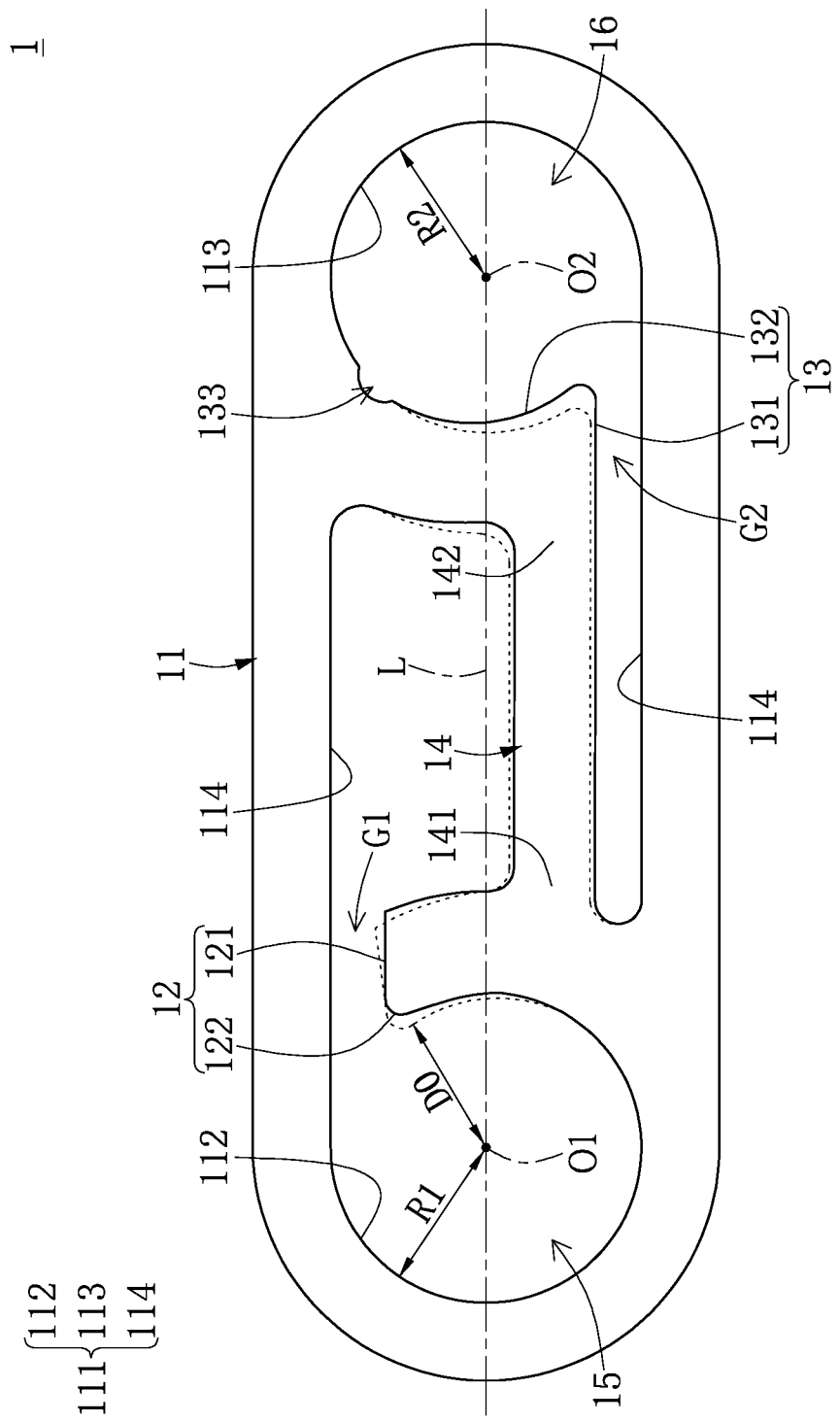
FIG. 4 is a planar view showing the torsion washer of FIG. 3 when receiving a pressure force.

As shown in FIGS. 3 and 4, the first abutting arm 12 and the second abutting arm 13 extend from the inner edge 111 of the external ring-shaped portion 11 and are arranged separate from each other. Furthermore, the first abutting arm 12 and the second abutting arm 13 in the present embodiment respectively extend from the two connecting segments 114, but the present disclosure is not limited thereto. A first free end 121 of the first abutting arm 12 and a second free end 131 of the second abutting arm 13 do not contact the inner edge 111 of the external ring-shaped portion 11.

Specifically, the first abutting arm 12 and the first arc segment 112 of the external ring-shaped portion 11 co-define a first thru-hole 15, and the second abutting arm 13 and the second arc segment 113 of the external ring-shaped portion 11 co-define a second thru-hole 16. Since the first free end 121 of the first abutting arm 12 and the second free end 131 of the second abutting arm 13 do not contact the inner edge 111 of the external ring-shaped portion 11, each of the first thru-hole 15 and the second thru-hole 16 are not completely enclosed. In other words, the first free end 121 of the first abutting arm 12 and the inner edge 111 of the external ring-shaped portion 11 have a first gap G1 arranged there-between and in spatial communication with the first thru-hole 15. The second free end 131 of the second abutting arm 13 and the inner edge 111 of the external ring-shaped portion 11 have a second gap G2 arranged there-between and in spatial communication with the second thru-hole 16.

Moreover, the first abutting arm 12 has a first abutting portion 122 arranged on an inner side thereof, and a distance between the first abutting portion 122 and the first center of circle O1 is defined as an interference distance D0 that is less than the first radius R1 of the first arc segment 112. The first abutting portion 122 is preferably arranged on a portion of the inner side of the first abutting arm 12 adjacent to the first free end 121, but the present disclosure is not limited thereto.

The second abutting arm 13 includes a second abutting portion 132 arranged on an inner side thereof, and the second abutting portion 132 in the present embodiment is an arc edge having a center of circle substantially overlapping with the second center of circle O2. That is to say, a radius of the second abutting portion 132 is substantially equal to the second radius R2 of the second arc segment 113, but the present disclosure is not limited thereto. In addition, the second abutting arm 13 can include a notch 133 recessed in the inner side thereof for allowing passage of a lubricating oil.

As shown in FIGS. 3 and 4, the connecting lever 14 has a first end 141 and a second end 142 opposite to the first end 141, and the first end 141 and the second end 142 are respectively connected to the first abutting arm 12 and the second abutting arm 13. Moreover, the connecting lever 14 is spaced apart from the inner edge 111 of the external ring-shaped portion 11 (i.e., the connecting lever 14 is spaced apart from each of the two connecting segments 114 by a distance as shown in FIG. 3), and the first abutting arm 12 and the second abutting arm 13 are interlinked with each other through the connecting lever 14 (as shown in FIG. 4).

Specifically, as shown in FIG. 4, the first abutting portion 12 can be applied with a pressure to rotate the first abutting arm 12 around a rotating center, which can be a connecting portion of the first abutting arm 12 and the inner edge 111, and toward the second abutting arm 13 for rotating the second abutting arm 13 through the connecting lever 14, so that the second abutting arm 13 can be driven to rotate around a rotating center, which can be a connecting portion of the second abutting arm 13 and the inner edge 111, and toward the second arc segment 113. In other words, the first abutting portion 12 is configured to be moved away from the first center of circle O1 so as to deform the second abutting arm 13 in a direction away from the second center of circle O2 through the connecting lever 14. Moreover, a ratio between a displacement of the first free end 121 of the first abutting arm 12 and a displacement of the second free end 131 of the second abutting arm 13 can be adjusted according to the connecting points of the first abutting arm 12 and the second abutting arm 13 with respect to the connecting lever 14.

In the present embodiment, the connecting lever 14 is in an elongated shape, and a longitudinal direction of the connecting lever 14 is substantially parallel to the central line L. The connecting lever 14 is arranged at one side of the central line L (e.g., the lower side of the central line L as shown in FIG. 3). The first end 141 of the connecting lever 14 is connected to a lower half portion of the first abutting arm 12, and the second end 142 of the connecting lever 14 is connected to the second free end 131 of the second abutting arm 13. However, the structure of the connecting lever 14 and the connecting points of the connecting lever 14 with respect to the first abutting arm 12 and the second abutting arm 13 can be adjusted according to design requirements, and are not limited by the present embodiment.

Figure 5:
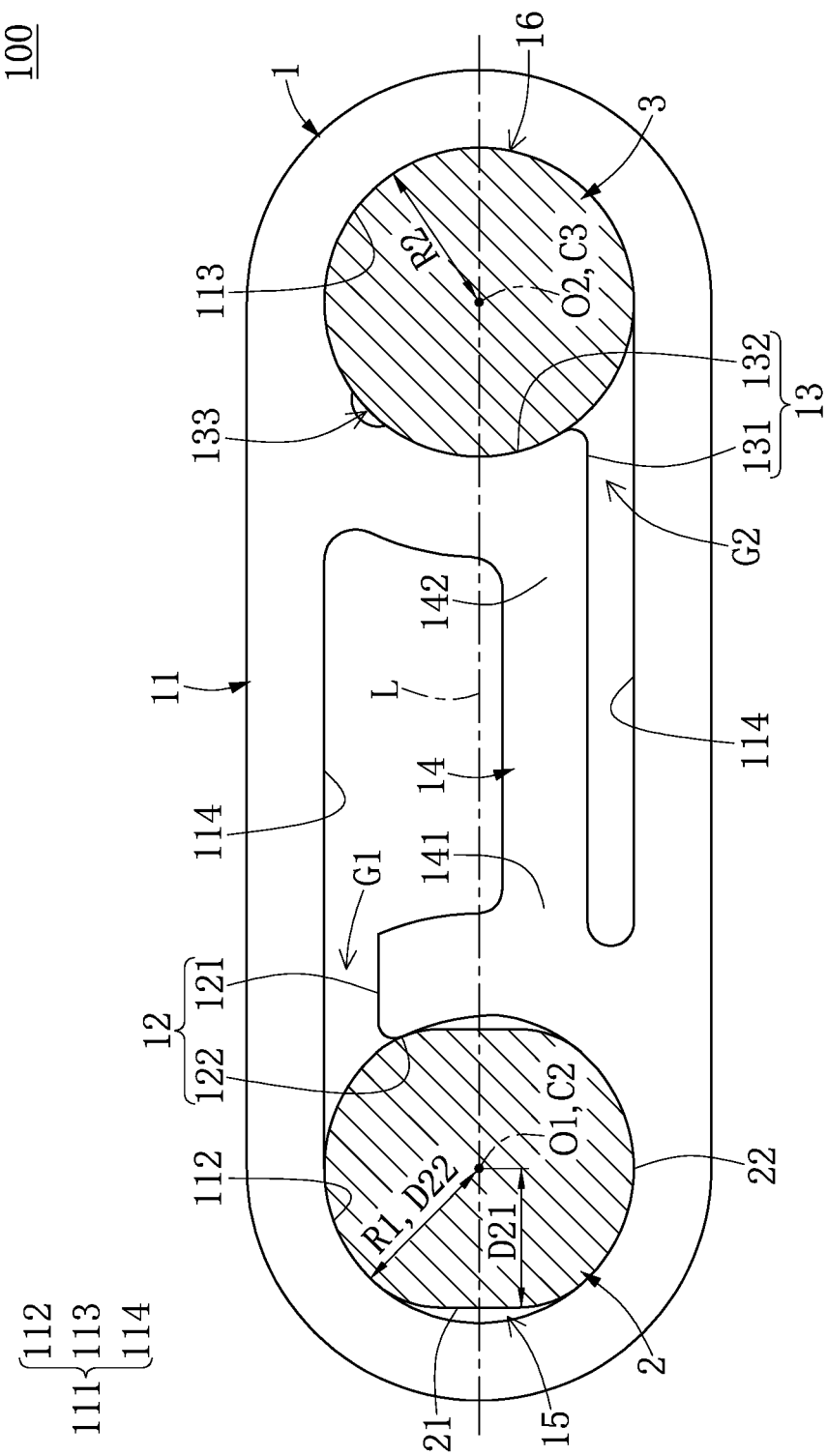
FIG. 5 is a cross-sectional view of FIG. 1.

As shown in FIG. 5, the first shaft 2 passes through the first thru-hole 15 of each of the torsion washers 1, and the first shaft 2 is positioned between the first arc segment 112 and the first abutting portion 122 of each of the torsion washers 1. An outer surface of the first shaft 2 includes a non-contact surface 21 and a contact surface 22, and a central axis C2 of the first shaft 2 preferably overlaps with the first center of circle O1 of each of the torsion washers 1, but the present disclosure is not limited thereto.

Specifically, a distance D22 between the contact surface 22 and the central axis C2 of the first shaft 2 is substantially equal to the first radius R1 of the first arc segment 112, and a distance D21 between the non-contact surface 21 and the central axis C2 of the first shaft 2 is less than the interference distance D0 (as shown in FIGS. 3 and 5). Therefore, when the first shaft 2 is spun around the central axis C2 thereof in a predetermined angle range (e.g., a central angle of the contact surface 22 with respect to the central axis C2), the contact surface 22 of the first shaft 2 pushes the first abutting portion 122 apart to move (or rotate) the second abutting arm 13 through the connecting lever 14. In the present disclosure, the term "spin" is used to refer to own-axis rotation.

As shown in FIG. 5, the second shaft 3 passes through the second thru-hole 16 of each of the torsion washers 1, and the second shaft 3 is positioned between the second arc segment 113 and the second abutting portion 132 of each of the torsion washers 1. A central axis C3 of the second shaft 3 preferably overlaps with the second center of circle O2 of each of the torsion washers 1, and is parallel to the central axis C2 of the first shaft 2, but the present disclosure is not limited thereto. Moreover, a cross section of the second shaft 3 arranged around one of the torsion washers 1 is in a circular shape having a radius substantially equal to the second radius R2 of the second arc segment 113 of the one of the torsion washers 1.

In summary, for each of the torsion washers 1, when the first shaft 2 is spun around the central axis C2 thereof in the predetermined angle range, the first shaft 2 pushes the first abutting portion 122 apart so as to drive the second abutting arm 13 through the connecting lever 14 to abut against the second shaft 3 (e.g., the second abutting portion 132 abuts against the second shaft 3 and entirely contacts with an outer surface of the second shaft 3), thereby providing a high torsion with stable values.

In addition, for each of the torsion washers 1, when the first shaft 2 is spun around the central axis C2 thereof out of the predetermined angle range (e.g., a central angle of the non-contact surface 21 with respect to the central axis C2), the first abutting portion 122 faces the non-contact surface 21 and does not contact the first shaft 2 (e.g., the first abutting portion 122, the connecting lever 14, and the second abutting portion 132 can be maintained at an initial position), thereby providing a low torsion with stable values.

Accordingly, the torsion device 100 of the present disclosure adopts a specific structure of the torsion washer 1 (e.g., the connecting lever 14 connects the first abutting arm 12 to the second abutting arm 13) to cooperate with the first shaft 2 and the second shaft 3, so that the torsion device 100 can provide torsions of different values as the first shaft 2 is spun to different positions relative to the torsion washers 1. Thus, the torsion device 100 of the present disclosure can be applied to an electronic device demanding different torques. For example, when the torsion device 100 of the present embodiment is applied to connect a touch-control screen and a keyboard of a laptop computer, the touch-control screen can be raised from a closed position with one hand by a lower torsion, and can provide a higher torsion for supporting the touch-control function of the touch-control screen when the touch-control screen and the keyboard have an angle within a range of 85~100 degrees.

Second Embodiment

Figure 6:
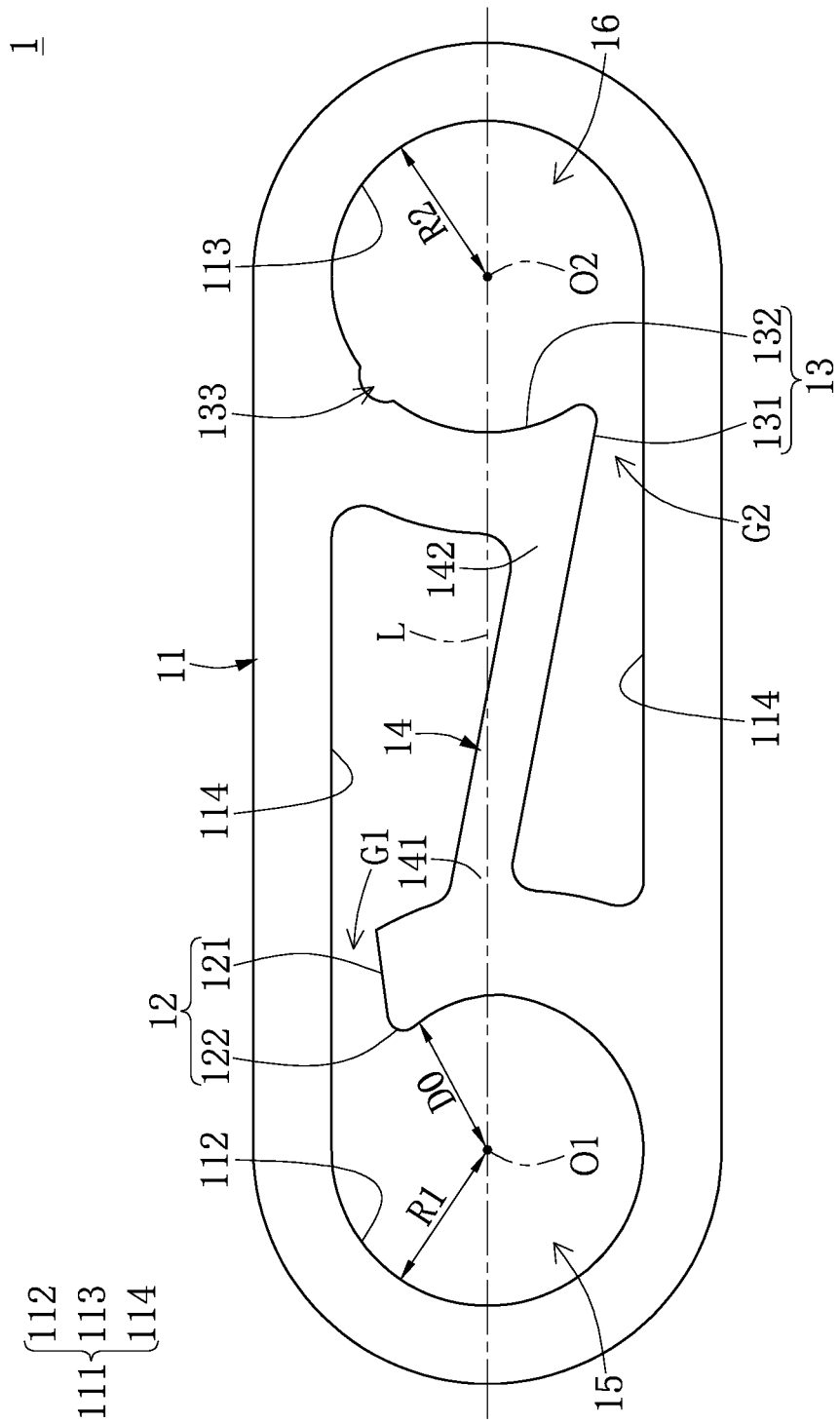
FIG. 6 is a planar view showing the torsion washer according to a second embodiment of the present disclosure.
Figure 7:
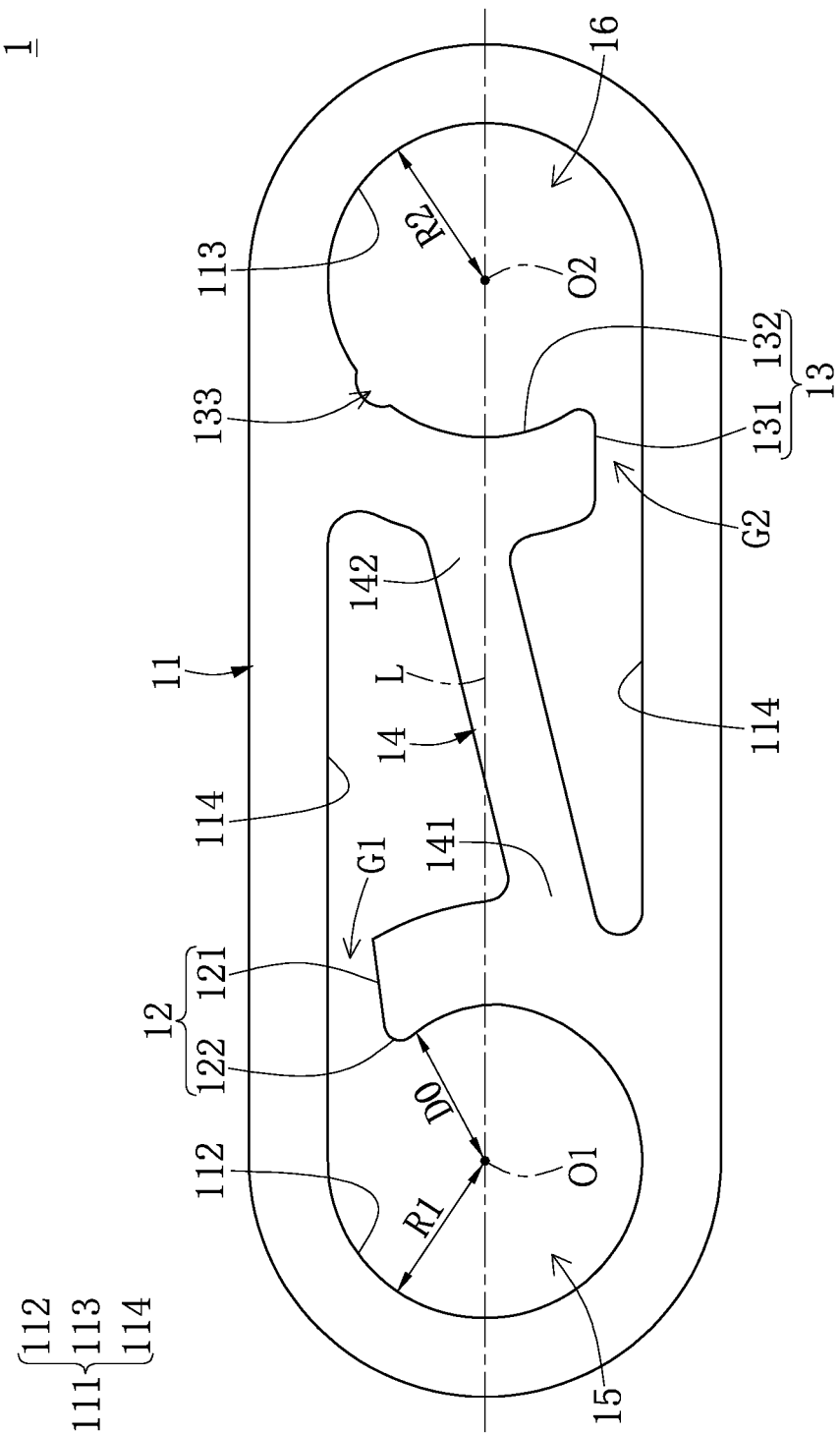
FIG. 7 is a planar view showing the torsion washer in another configuration according to the second embodiment of the present disclosure.

Reference is made to FIGS. 6 and 7, which illustrate a second embodiment of the present disclosure. The second embodiment is similar to the first embodiment, and the difference between the second embodiment and the first embodiment resides in the structure of the torsion washer 1. Specifically, in each of the torsion washers 1 of the present embodiment, an angle between the longitudinal direction of the connecting lever 14 and the central line L is less than 90 degrees.

Third Embodiment

Figure 8:
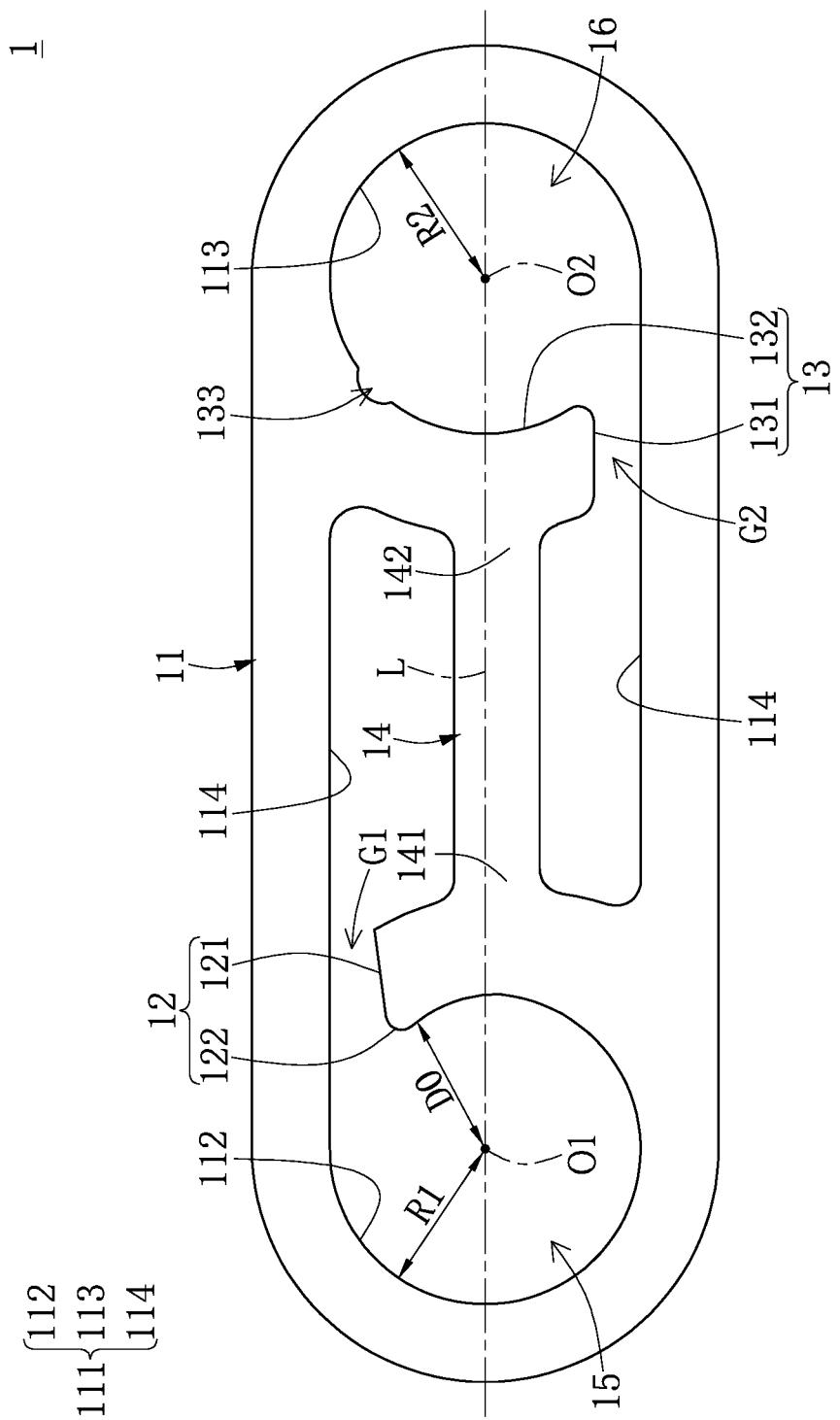
FIG. 8 is a planar view showing the torsion washer according to a third embodiment of the present disclosure.

Reference is made to FIG. 8, which illustrates a third embodiment of the present disclosure. The third embodiment is similar to the first embodiment, and the difference between the third embodiment and the first embodiment resides in the structure of the torsion washer 1. Specifically, in each of the torsion washers 1 of the present embodiment, the longitudinal direction of the connecting lever 14 substantially overlaps with the central line L.

Fourth Embodiment

Figure 9:
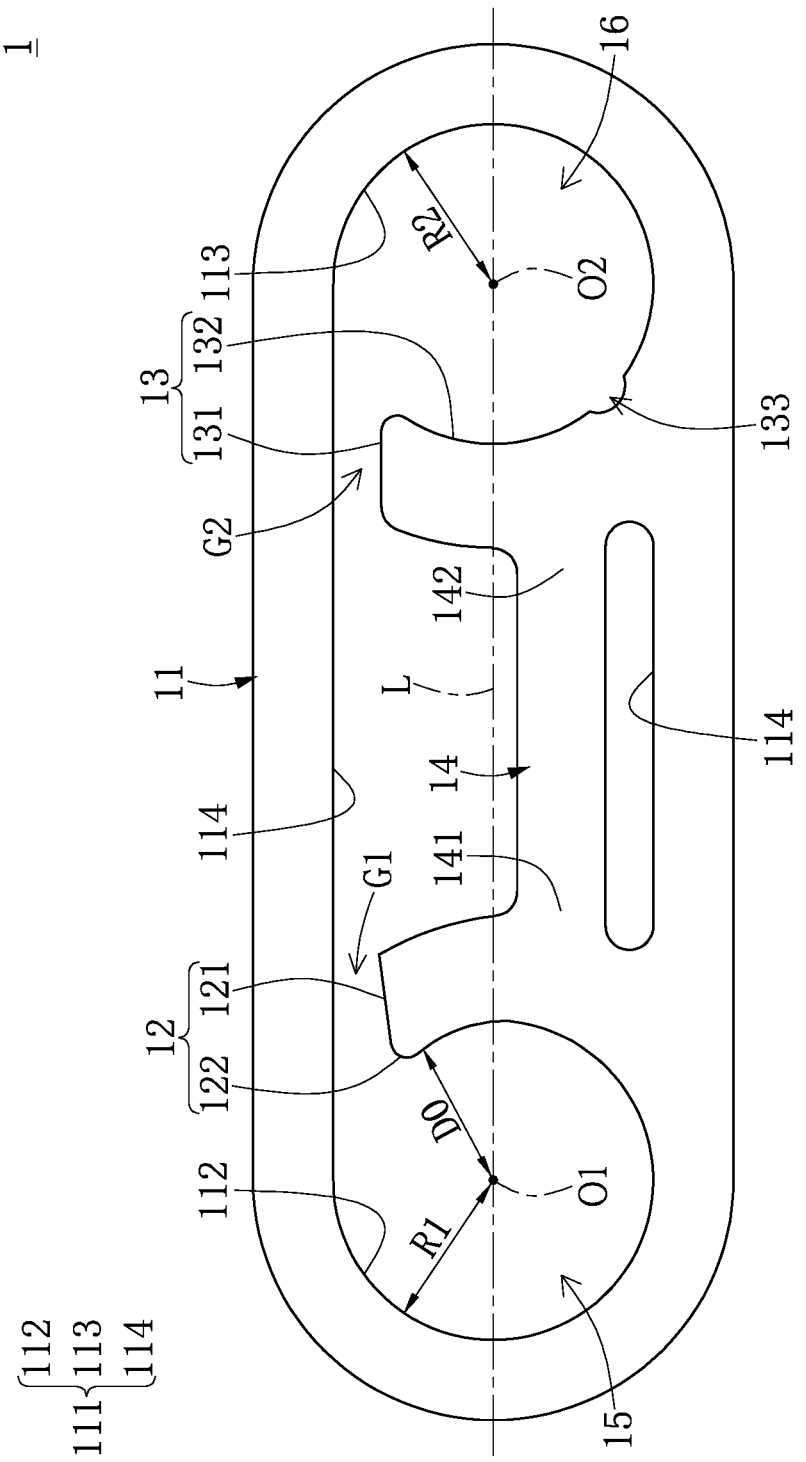
FIG. 9 is a planar view showing the torsion washer according to a fourth embodiment of the present disclosure.

Reference is made to FIG. 9, which illustrates a fourth embodiment of the present disclosure. The fourth embodiment is similar to the first embodiment, and the difference between the fourth embodiment and the first embodiment resides in the structure of the torsion washer 1. Specifically, in each of the torsion washers 1 of the present embodiment, the first abutting arm 12 and the second abutting arm 13 extend from one of the two connecting segments 114 toward the other connecting segment 114.

Fifth Embodiment

Figure 10:
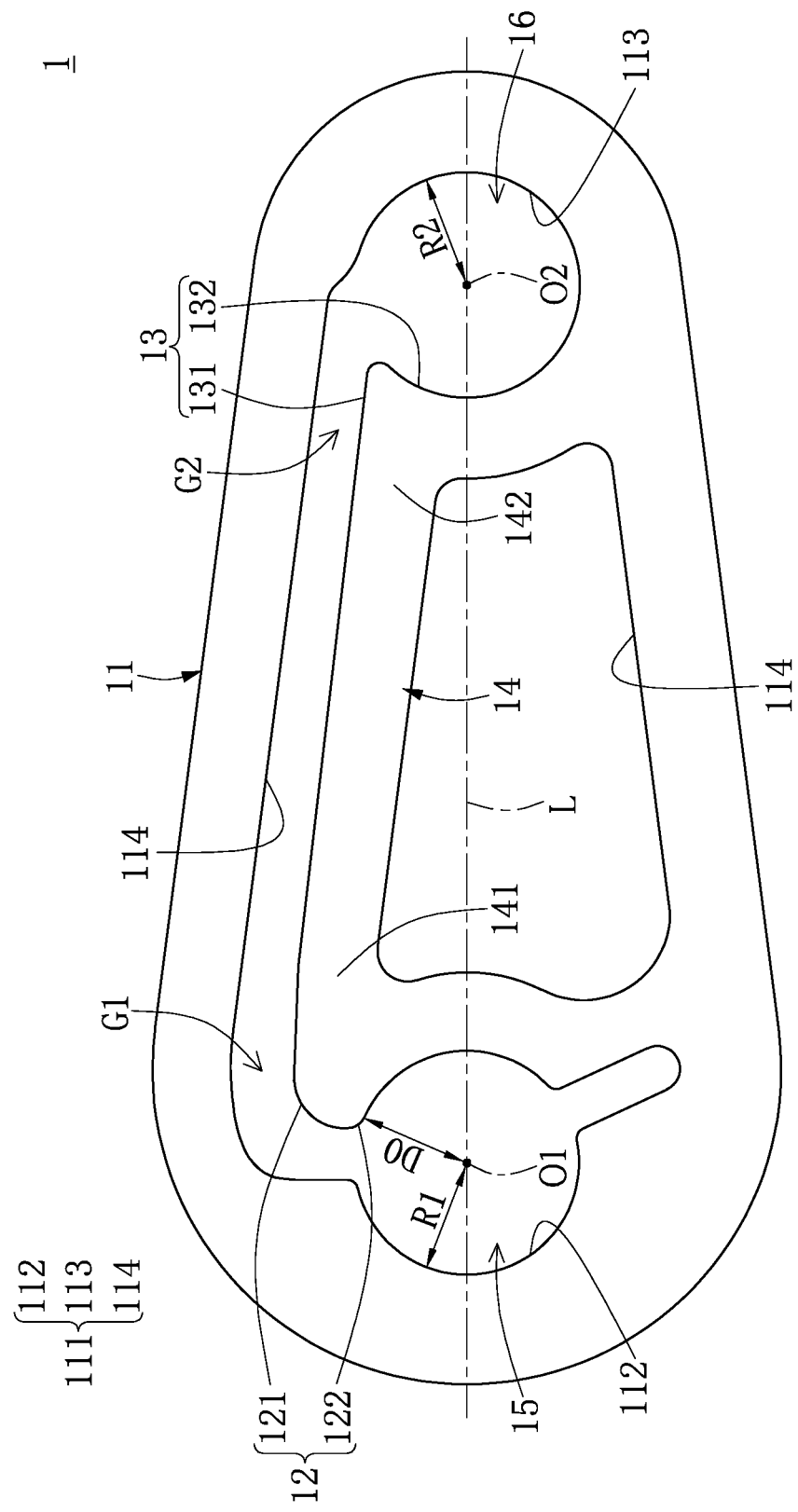
FIG. 10 is a planar view showing the torsion washer according to a fifth embodiment of the present disclosure.

Reference is made to FIG. 10, which illustrates a fifth embodiment of the present disclosure. The fifth embodiment is similar to the first embodiment, and the difference between the fifth embodiment and the first embodiment resides in the structure of the torsion washer 1.

Specifically, in each of the torsion washers 1 of the present embodiment, the two connecting segments 114 of the external ring-shaped portion 11 are non-parallel to each other. Moreover, each of the two connecting segments 114 is non-parallel to the central line L. The first radius R1 of the first arc segment 112 in the present embodiment is substantially equal to the second radius R2 of the second arc segment 113. Furthermore, a portion of the torsion washer 1 (e.g., the left portion of the torsion washer 1 as shown in FIG. 10) arranged around the first thru-hole 15 is larger than a portion of the torsion washer 1 (e.g., the right portion of the torsion washer 1 as shown in FIG. 10) arranged around the second thru-hole 16.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A torsion device, comprising:
    a plurality of torsion washers stacked in a row and each integrally formed as a one-piece structure, wherein side edges of the torsion washers are flush with each other, and each of the torsion washers includes:
        an external ring-shaped portion being completely enclosed and having an inner edge, wherein the inner edge includes a first arc segment and a second arc segment opposite to the first arc segment, and a first center of circle of the first arc segment and a second center of circle of the second arc segment are located in a space surrounded by the inner edge;
        a first abutting arm and a second abutting arm both extending from the inner edge and arranged separate from each other, wherein a first free end of the first abutting arm and a second free end of the second abutting arm do not contact the inner edge, the first abutting arm and the first arc segment co-define a first thru-hole, and the second abutting arm and the second arc segment co-define a second thru-hole, and wherein a distance between a first abutting portion of the first abutting arm and the first center of circle is defined as an interference distance that is less than a first radius of the first arc segment; and
        a connecting lever having a first end and a second end opposite to the first end, wherein the first end and the second end are respectively connected to the first abutting arm and the second abutting arm, the connecting lever is spaced apart from the inner edge, and the first abutting arm and the second abutting arm are interlinked with each other through the connecting lever;
    a first shaft passing through the first thru-hole of each of the torsion washers, wherein the first shaft is positioned between the first arc segment and the first abutting portion of each of the torsion washers; and
    a second shaft passing through the second thru-hole of each of the torsion washers,
    wherein for each of the torsion washers, when the first shaft is spun around a central axis thereof in a predetermined angle range, the first shaft pushes the first abutting portion apart so as to drive the second abutting arm through the connecting lever to abut against the second shaft.

2. The torsion device as claimed in claim 1, wherein in each of the torsion washers, the inner edge of the external ring-shaped portion includes two connecting segments, and the first abutting arm and the second abutting arm extend from one of the two connecting segments toward the other connecting segment.

3. The torsion device as claimed in claim 1, wherein in each of the torsion washers, the inner edge of the external ring-shaped portion includes two connecting segments, and the first abutting arm and the second abutting arm respectively extend from the two connecting segments.

4. The torsion device as claimed in claim 1, wherein a cross section of the second shaft arranged around one of the torsion washers is in a circular shape having a radius substantially equal to a second radius of the second arc segment of the one of the torsion washers, wherein in each of the torsion washers, the second abutting arm includes a second abutting portion, and the second abutting portion is an arc edge having a center of circle substantially overlapping with the second center of circle, and wherein when the first shaft is spun around the center axis thereof in the predetermined angle range, the second abutting portion abuts against the second shaft and entirely contacts with an outer surface of the second shaft.

5. The torsion device as claimed in claim 4, wherein in each of the torsion washers, the inner edge of the external ring-shaped portion includes two connecting segments arranged between the first arc segment and the second arc segment and that are non-parallel to each other, the first radius of the first arc segment is substantially equal to the second radius of the second arc segment, and a portion of the torsion washer arranged around the first thru-hole is larger than a portion of the torsion washer arranged around the second thru-hole.

6. The torsion device as claimed in claim 1, wherein in each of the torsion washers, the external ring-shaped portion defines a central line passing through the first center of circle and the second center of circle, and a longitudinal direction of the connecting lever is substantially parallel to the central line.

7. The torsion device as claimed in claim 1, wherein in each of the torsion washers, the external ring-shaped portion defines a central line passing through the first center of circle and the second center of circle, and an angle between a longitudinal direction of the connecting lever and the central line is less than 90 degrees.

8. The torsion device as claimed in claim 1, wherein in each of the torsion washers, the external ring-shaped portion defines a central line passing through the first center of circle and the second center of circle, and a longitudinal direction of the connecting lever substantially overlaps with the central line.

9. The torsion device as claimed in claim 1, wherein an outer surface of the first shaft includes a non-contact surface and a contact surface, a distance between the contact surface and the central axis is substantially equal to the first radius of the first arc segment, and a distance between the non-contact surface and the central axis is less than the interference distance, and wherein when the first shaft is spun around the central axis thereof in the predetermined angle range, the contact surface of the first shaft pushes the first abutting portion apart.

10. A torsion washer integrally formed as a one-piece structure, comprising:
    an external ring-shaped portion being completely enclosed and having an inner edge, wherein the inner edge includes a first arc segment and a second arc segment opposite to the first arc segment, and a first center of circle of the first arc segment and a second center of circle of the second arc segment are located in a space surrounded by the inner edge;
    a first abutting arm and a second abutting arm both extending from the inner edge and arranged separate from each other, wherein a first free end of the first abutting arm and a second free end of the second abutting arm do not contact the inner edge, the first abutting arm and the first arc segment co-define a first thru-hole, and the second abutting arm and the second arc segment co-define a second thru-hole, and wherein a distance between a first abutting portion of the first abutting arm and the first center of circle is defined as an interference distance that is less than a first radius of the first arc segment; and a connecting lever having a first end and a second end opposite to the first end, wherein the first end and the second end are respectively connected to the first abutting arm and the second abutting arm, the connecting lever is spaced apart from the inner edge, and the first abutting arm and the second abutting arm are interlinked with each other through the connecting lever.

11. The torsion washer as claimed in claim 10, wherein the inner edge of the external ring-shaped portion includes two connecting segments, and the first abutting arm and the second abutting arm extend from one of the two connecting segments toward the other connecting segment.

12. The torsion washer as claimed in claim 10, wherein the inner edge of the external ring-shaped portion includes two connecting segments, and the first abutting arm and the second abutting arm respectively extend from the two connecting segments.

13. The torsion washer as claimed in claim 10, wherein the inner edge of the external ring-shaped portion includes two connecting segments arranged between the first arc segment and the second arc segment and that are non-parallel to each other, the first radius of the first arc segment is substantially equal to the second radius of the second arc segment, and a portion of the torsion washer arranged around the first thru-hole is larger than a portion of the torsion washer arranged around the second thru-hole.

14. The torsion washer as claimed in claim 10, wherein the external ring-shaped portion defines a central line passing through the first center of circle and the second center of circle, and a longitudinal direction of the connecting lever is substantially parallel to the central line.

15. The torsion washer as claimed in claim 10, wherein the external ring-shaped portion defines a central line passing through the first center of circle and the second center of circle, and an angle between a longitudinal direction of the connecting lever and the central line is less than 90 degrees.

16. The torsion washer as claimed in claim 10, wherein the external ring-shaped portion defines a central line passing through the first center of circle and the second center of circle, and a longitudinal direction of the connecting lever substantially overlaps with the central line.

17. The torsion washer as claimed in claim 10, wherein the first abutting portion is configured to be moved away from the first center of circle so as to deform the second abutting arm in a direction away from the second center of circle through the connecting lever.

* * * * *